United States Patent
Saint-Marc et al.

(10) Patent No.: US 12,315,245 B2
(45) Date of Patent: May 27, 2025

(54) METHOD AND DEVICE FOR DETERMINING ALTITUDE OBSTACLES

(71) Applicant: THALES, Courbevoie (FR)

(72) Inventors: Elodie Saint-Marc, Toulouse (FR); David Martinez, Toulouse (FR); Arnaud Jerez, Toulouse (FR); Roman Pasquette, Toulouse (FR)

(73) Assignee: THALES, Courbevoie (FR)

( * ) Notice: Subject to any disclaimer, the term of this patent is extended or adjusted under 35 U.S.C. 154(b) by 202 days.

(21) Appl. No.: 17/800,641

(22) PCT Filed: Feb. 16, 2021

(86) PCT No.: PCT/EP2021/053730
§ 371 (c)(1),
(2) Date: Aug. 18, 2022

(87) PCT Pub. No.: WO2021/165237
PCT Pub. Date: Aug. 26, 2021

(65) Prior Publication Data
US 2023/0069829 A1     Mar. 9, 2023

(30) Foreign Application Priority Data
Feb. 18, 2020 (FR) ...................... 2001594

(51) Int. Cl.
*G06V 20/10* (2022.01)
*B64C 39/02* (2023.01)
*B64U 101/30* (2023.01)
*G05D 1/00* (2024.01)
*G06T 7/10* (2017.01)
*G06T 7/60* (2017.01)
*G06V 10/82* (2022.01)
*G06V 20/17* (2022.01)

(52) U.S. Cl.
CPC .......... *G06V 20/176* (2022.01); *B64C 39/024* (2013.01); *G05D 1/106* (2019.05); *G06T 7/10* (2017.01); *G06T 7/60* (2013.01); *G06V 10/82* (2022.01); *G06V 20/17* (2022.01); *B64U 2101/30* (2023.01); *G06T 2207/10021* (2013.01); *G06T 2207/10032* (2013.01); *G06T 2207/20081* (2013.01); *G06T 2207/20084* (2013.01); *G06T 2207/30181* (2013.01)

(58) Field of Classification Search
CPC ...... G06V 20/176; G06V 10/82; G06V 20/17; G06V 20/13; G06V 10/765; G06V 10/764; G06V 20/10; B64C 39/024; G05D 1/106; G06T 7/10; G06T 7/60; G06T 2207/10021; G06T 2207/10032; G06T 2207/20081; G06T 2207/20084; G06T 2207/30181; G06T 7/62; G06T 2207/10036; G06T 2207/10041; G06T 2207/10044; G06T 2207/10048; G06T 7/174; G06T 2207/30232; G06T 2207/30212; B64U 2101/30; G01C 5/00; G01C 3/00; G06F 18/2413; G06F 18/254
See application file for complete search history.

(56) References Cited

U.S. PATENT DOCUMENTS

| | | | | |
|---|---|---|---|---|
| 5,943,164 A * | 8/1999 | Rao | ................. | G02B 30/50 703/2 |
| 7,440,591 B1 * | 10/2008 | McCusker | ............. | G06V 20/13 434/150 |
| 10,032,311 B1 * | 7/2018 | Taylor | ..................... | G06T 19/20 |
| 2005/0273223 A1 | 12/2005 | Artini et al. | | |
| 2006/0235581 A1 * | 10/2006 | Petillon | ................ | G08G 5/0078 701/3 |
| 2006/0239537 A1 * | 10/2006 | Shragai | ..................... | G06T 5/50 348/42 |

(Continued)

FOREIGN PATENT DOCUMENTS

JP   H-06149376 A   *   5/1994   ............. G05B 13/02

OTHER PUBLICATIONS

Translation of JPH-06149376-A retrieved from IP.com on May 31, 2023 (Year: 2024).*

(Continued)

*Primary Examiner* — Fadey S. Jabr
*Assistant Examiner* — Faris Asim Shaikh
(74) *Attorney, Agent, or Firm* — B. Aaron Schulman, Esq.; Stites & Harbison, PLLC

(57) ABSTRACT

The invention relates to a method and a device for determining altitude obstacles. The method includes, for a given geographical area, obtaining (50) digital aerial images of portions of terrain of said geographical area from at least one digital aerial image source, forming a set of digital aerial images covering said geographical area. The method includes applying (54) a first image processing to the digital images of said set of images so as to obtain a first set of obstacles present in said geographical area and an associated first height estimate, then applying (56) a second image processing to the images of said set of digital images so as to obtain a second set of obstacles present in said geographical zone and a second associated height estimate, greater than or equal to said predetermined minimum height. Depending on the first and second height estimates, a consolidated set of altitude obstacles with a height greater than or equal to said predetermined minimum height, present in said geographical area, is obtained (66, 68) and attributes of said altitude obstacles are stored (70).

18 Claims, 4 Drawing Sheets

(56) References Cited

U.S. PATENT DOCUMENTS

| | | | | |
|---|---|---|---|---|
| 2013/0082873 | A1* | 4/2013 | Tang | G01S 19/45 |
| | | | | 342/357.28 |
| 2013/0282208 | A1* | 10/2013 | Mendez-Rodriguez | |
| | | | | G01S 17/933 |
| | | | | 701/16 |
| 2014/0118596 | A1* | 5/2014 | Nakazono | H04N 23/63 |
| | | | | 348/333.01 |
| 2014/0354635 | A1* | 12/2014 | Nascetti | G01C 11/06 |
| | | | | 345/420 |
| 2015/0363645 | A1* | 12/2015 | Chen | G06V 20/176 |
| | | | | 382/173 |
| 2016/0085238 | A1* | 3/2016 | Hayes | G08G 5/0082 |
| | | | | 701/4 |
| 2016/0144847 | A1* | 5/2016 | Mills | B60W 10/06 |
| | | | | 701/70 |
| 2016/0292626 | A1* | 10/2016 | Green | G06Q 50/02 |
| 2017/0084038 | A1 | 3/2017 | Dane et al. | |
| 2017/0169605 | A1* | 6/2017 | Salomonsson | G06T 7/55 |
| 2017/0243404 | A1* | 8/2017 | Morales | G06T 7/60 |
| 2017/0328716 | A1* | 11/2017 | Ma | G06F 18/2136 |
| 2017/0337824 | A1* | 11/2017 | Chen | G08G 5/0086 |
| 2018/0046187 | A1* | 2/2018 | Martirosyan | G05D 1/0094 |
| 2018/0218214 | A1 | 8/2018 | Pestun et al. | |
| 2019/0026572 | A1* | 1/2019 | Theodosis | G06V 20/586 |
| 2019/0208097 | A1* | 7/2019 | Liu | G01S 3/00 |
| 2019/0265705 | A1* | 8/2019 | Zhang | G05D 1/227 |
| 2019/0286936 | A1* | 9/2019 | Fuchs | G06F 18/23 |
| 2020/0202616 | A1* | 6/2020 | Yu | G06T 17/05 |
| 2020/0218289 | A1* | 7/2020 | Gu | G08G 5/0086 |
| 2020/0319646 | A1* | 10/2020 | O'Donnell | G05D 1/0212 |
| 2020/0372251 | A1* | 11/2020 | Sekiya | G06Q 50/02 |
| 2020/0402300 | A1* | 12/2020 | Ding | G06N 3/08 |
| 2021/0271847 | A1* | 9/2021 | Courtiol | G06V 10/50 |
| 2021/0397857 | A1* | 12/2021 | Liu | G06V 20/58 |
| 2021/0398310 | A1* | 12/2021 | Ge | G06V 10/25 |
| 2022/0091608 | A1* | 3/2022 | Feng | G05D 1/0044 |
| 2023/0351625 | A1* | 11/2023 | Hughes | G06T 7/593 |

OTHER PUBLICATIONS

International Search Report for PCT/EP2021/053730 dated Apr. 22, 2021.

Preliminary Search Report for FR 2001594 dated Nov. 30, 2020.

* cited by examiner

METHOD AND DEVICE FOR DETERMINING ALTITUDE OBSTACLES

FIELD OF THE INVENTION

The present invention relates to a method and a device for determining altitude obstacles with a height greater than or equal to a predetermined height, said altitude obstacles being likely to hinder the aircraft navigation at low or very low altitude.

The invention further relates to an associated method and navigation device for flight at low or very low altitude.

BACKGROUND OF THE INVENTION

The invention belongs to the field of aeronautics, and in particular of aircraft navigation at low or very low altitude.

Indeed, in a known manner, the airspace is divided into a plurality of altitude sectors, comprising in particular, a low altitude sector with an altitude greater than 30 meters and less than 100 meters and a very low altitude of less than 30 meters.

For aircraft flying at low or very low altitude, altitude obstacles are present, e.g. electric or telecommunications poles, wind turbines, electric cables, etc., and they constitute potential dangers.

Such altitude obstacles are generally mapped in airport areas limited to specific geographical perimeters, and defined according to specific rules.

However, different types of aircraft, such as unmanned aircraft (e.g. drones) or aerostats, which fly at low and very low altitudes, are increasingly used and the flight thereof is not limited to airport areas.

The different regulatory provisions apply in various geographical areas, and the level of completeness of the commercial products available to date, which list the altitude obstacles present, is not satisfactory.

There is a need to provide a more comprehensive determination of altitude obstacles, with location and identification, which applies to any geographical area.

SUMMARY OF THE INVENTION

To this end, the invention proposes, according to a first aspect, a method for determining altitude obstacles of a height greater than or equal to a predetermined minimum height, said altitude obstacles being likely to hinder aircraft navigation at low or very low altitude. Such method includes the steps of:

- obtaining, for a given geographical area, digital aerial images of portions of terrain of said geographical area from at least one digital aerial image source, forming a set of digital aerial images covering said geographical area,
- applying a first image processing to the digital images of said set of images so as to obtain a first set of obstacles present in said geographical area and a first associated height estimate,
- applying a second image processing to the images of said set of digital images in order to obtain a second set of obstacles present in said geographical zone and a second associated height estimate, greater than or equal to said predetermined minimum height,
- determining, on the basis of the first and second height estimates, a consolidated set of altitude obstacles with a height greater than or equal to said predetermined minimum height present in said geographical zone, and storing attributes of said altitude obstacles.

Advantageously, the method for determining altitude obstacles according to the invention can be used for automatically obtaining a consolidated set of obstacles, due to the implementation of a first image processing and of a second image processing, and to the use of the height estimates obtained by the processing operations.

The method for determining altitude obstacles according to the invention can further have one or a plurality of the features below, taken independently or according to all technically feasible combinations.

The first image processing further provides an indication of whether each obstacle of said first set of obstacles belongs to a predetermined category among a plurality of categories of obstacles which may constitute altitude obstacles.

The first image processing includes a segmentation by the application of a neural network, previously trained to identify obstacles belonging to one of the categories of said plurality of categories of obstacles.

The first image processing includes, for each obstacle identified, a calculation used for obtaining a first estimate of the height of said obstacle.

The calculation is a function of a camera angle of a device for acquiring an digital aerial image comprising said identified obstacle or of a corresponding illumination angle from the sun and an estimate of the length of the shadow of said identified obstacle in said digital aerial image.

The second image processing is a stereoscopic processing, comprising a processing in pairs of digital images of said set of digital aerial images, a pair of digital images including two digital images of the same portion of terrain acquired with a known spatial camera offset, said stereoscopic processing consisting of obtaining a three-dimensional reconstruction of said portion of terrain.

The second processing further includes a detection and a location of point-like and linear objects with a height greater than or equal to said predetermined minimum height in said three-dimensional reconstruction of the portion of terrain.

The determination of a consolidated set of obstacles further includes a step of checking the estimated height of the obstacles based on at least one independent data source.

The independent data source is a digital terrain model.

The method further includes storing a set of attributes for each obstacle in the consolidated set of obstacles with a height greater than or equal to said predetermined minimum height present in said geographical area, said set of attributes including location, height and obstacle attributes.

The set of attributes is stored in a format chosen so as to form a database of altitude obstacles.

According to another aspect, the invention relates to a device for determining altitude obstacles with a height greater than or equal to a predetermined minimum height, said altitude obstacles being likely to hinder aircraft navigation at low or very low altitude. Such device includes at least one processor (4) configured for implementing modules suitable for:

- obtaining, for a given geographical area, digital aerial images of portions of terrain of said geographical area from at least one digital aerial image source, forming a set of digital aerial images covering said geographical area,
- applying a first image processing to the digital images of said set of images so as to obtain a first set of obstacles present in said geographical area and a first associated height estimate, applying a second image processing to the images of said set of digital images in order to obtain a second set of obstacles present in said geographical area and a second associated height estimate, greater than or equal to said predetermined minimum height, determining, based on the first and second height estimates, a consolidated set of altitude obstacles with a height greater than or equal to said predetermined minimum height present in said geographical zone, and storing attributes of said altitude obstacles.

According to another aspect, the invention relates to an information recording medium, on which software instructions are stored executing a method for determining altitude obstacles as briefly described above, when such instructions are executed by a programmable electronic device.

According to another aspect, the invention relates to a computer program comprising software instructions which, when implemented by a programmable electronic device, implement a method for determining altitude obstacles as briefly described above.

According to another aspect, the invention relates to an aircraft navigation method suitable for flying at low altitude in order to follow a trajectory flying over a given geographical area, including a step of obtaining a consolidated set of altitude obstacles present in said geographical area, said consolidated set of obstacles being determined by a method for determining altitude obstacles as briefly described above, and for avoiding altitude obstacles from said set of obstacles.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION OF EMBODIMENTS

Figure 1:
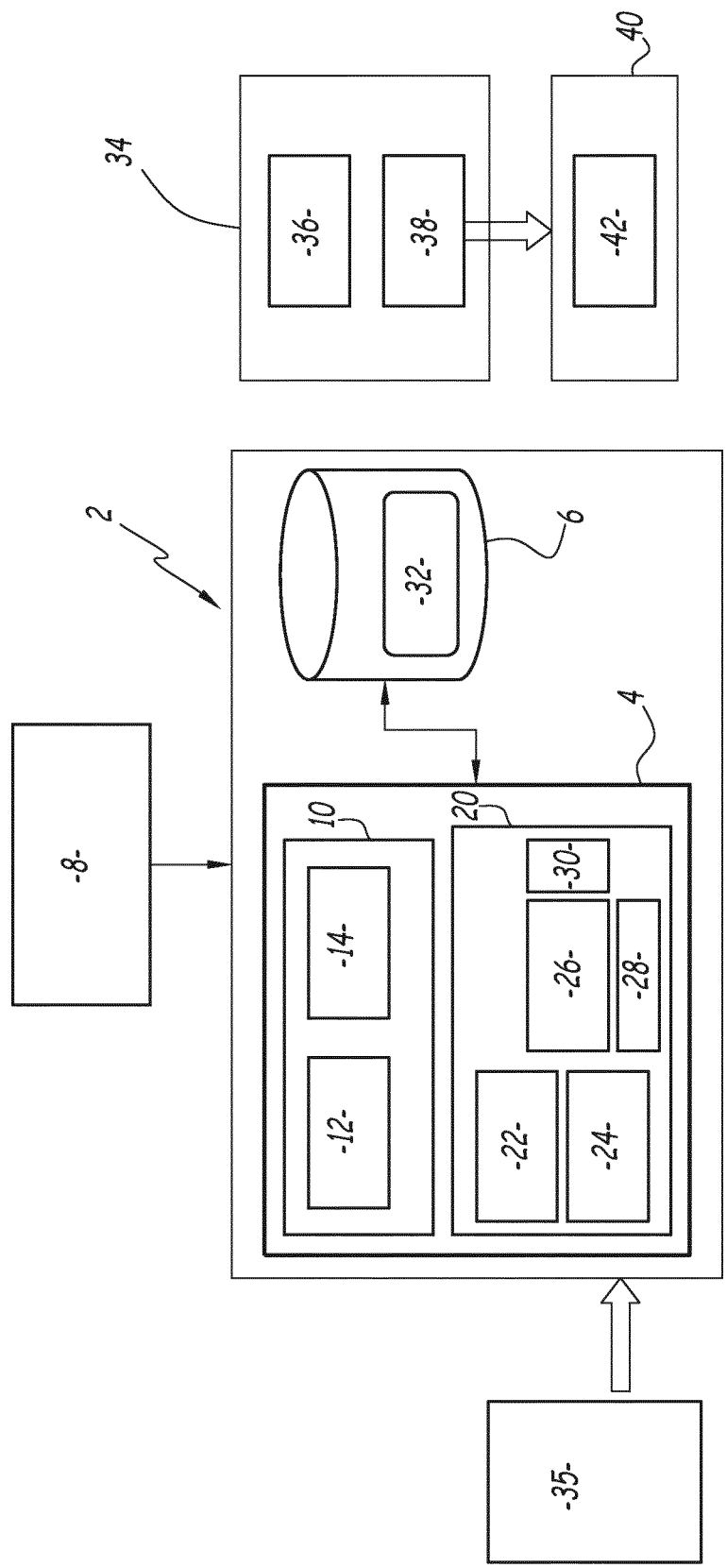
FIG. 1 schematically illustrates a device for determining altitude obstacles in an embodiment of the invention in a case of application of the invention.

FIG. 1 schematically illustrates a device 2 for determining altitude obstacles according to an embodiment of the invention, which are likely to hinder the flight of aircraft flying at very low altitude or at low altitude, therefore at altitudes comprised between 0 and 100 meters.

The term altitude obstacle hereinafter refers to a fixed object having at least one highest point with a height, with respect to the ground on which the obstacle rests, greater than or equal to a predetermined minimum height.

For example, the predetermined minimum height is set at 30 m. The height thus defined is a first indication of the height of a fixed object forming an altitude obstacle.

Another indication of the height of an altitude obstacle, which can be provided in addition, is an elevation of the highest point of the obstacle with respect to the mean sea level (or altitude). Elevation from mean sea level is a second indication of the height of a fixed object forming an altitude obstacle.

One of the subject matters of the invention is to automatically determine the presence of altitude obstacles in a chosen geographical area, and to characterize the altitude obstacles determined by at least one spatial location, an indication with a height and, in addition, an identification of belonging to a category among a predetermined set of categories.

The geographical area chosen is any geographical area. Of course, there is no difficulty in implementing the invention over a plurality of geographical areas.

The spatial location of an obstacle is for example provided by coordinates in a geolocated reference frame. Coordinates are for example latitude and longitude coordinates, expressed in decimal degrees.

At least two categories of altitude obstacles are distinguished, comprising point-like obstacles, e.g. pylons, poles, wind turbines, and linear obstacles, e.g. electric cables, cable cars, telephone lines.

Preferentially, a greater number of categories are used, so as to more accurately identify altitude obstacles present in a given geographical area.

The device 2 for automatically determining altitude obstacles is a programmable electronic device, e.g. a computer or a computer system comprising a plurality of connected computers.

The device 2 includes at least one electronic computing unit, e.g. a computing processor 4, and an electronic data storage unit 6, e.g. in the form of files or registers. The computing processor 4 is apt to execute computations and computer program code instructions or software instructions when the device 2 is powered on.

The device 2 includes a digital image acquisition unit 10 suitable for receiving digital aerial images acquired by an digital aerial image acquisition device 8, e.g. a satellite, a drone, or an aircraft carrying an embedded image acquisition device, e.g. an optical sensor or a radar.

The digital aerial images are for example digital images in the visible range. As a variant, the aerial images used are radar images or images in the infrared range.

According to another variant, the device 2 for determining altitude obstacles receives digital aerial images acquired by a plurality of acquisition sources.

For a given geographical area, the digital aerial images acquired by the image acquisition unit 10 are digital images of portions of the terrain of the geographical area which cover the entire geographical area concerned.

The digital image acquisition unit 10 includes a module 12 for receiving and storing digital images and a module 14 for normalizing digital images in order to put same in a chosen format. A set of digital images in homogeneous format in terms of image size, resolution and coding format is thus obtained.

The device 2 for determining altitude obstacles further includes a unit 20 for locating and identifying altitude obstacles in a geographical area, which includes a module 22 for applying a first image processing, a module 24 for applying a second image processing, a module 26 for merging the results of the first and second image processing, a module 28 for consolidating the results and a module 30 for storing the consolidated set of obstacles in a format chosen so as to form a database of obstacles of altitude 32. A plurality of embodiments of a method for determining altitude obstacles will be described below.

In one embodiment, the modules 22, 24, 26, 28 and 30 are embodied in the form of executable software instructions, which are recorded on a non-transient, computer-readable information medium. The computer-readable medium is for example a medium apt to store the electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or an optical card.

In a variant embodiment, the modules 22, 24, 26, 28 and 30 are each made in the form of a programmable logic component, such as an FPGA (Field Programmable Gate Array), a GPU (graphics processor) or a GPGPU (General-purpose processing on graphics processing units), or in the form of a dedicated integrated circuit, such as an ASIC (Application Specific Integrated Circuit).

The device 2 for determining altitude obstacles is further suitable for receiving data from an independent data source 35. For example the independent data source 35 is a cartographic database comprising a digital terrain model with altitude information on the points of the terrain of the geographical area under consideration.

The device 2 for determining altitude obstacles generates a database of altitude obstacles 32 for the given geographical area.

Such an obstacle database can subsequently be used for the navigation of aircraft flying at low or very low altitude.

In one embodiment, a navigation path calculation device 34 is configured for using an altitude obstacle database 32 previously generated by an altitude obstacle determination method according to the invention. Such a navigation trajectory calculation device 34 includes for example a module 36 for receiving a database of altitude obstacles for a chosen geographical zone, and a trajectory calculation module 38 for avoiding the listed altitude obstacles.

In one embodiment, a trajectory calculation device 34, for example depending on an aircraft mission, is located in a ground control center. As a variant, the trajectory calculation device 34 is embedded in an aircraft for a dynamic calculation or modification of trajectory during flight.

The trajectory is then used by an aircraft piloting system 40, on-board an aircraft, e.g. by an automatic piloting device 42.

Figure 2:
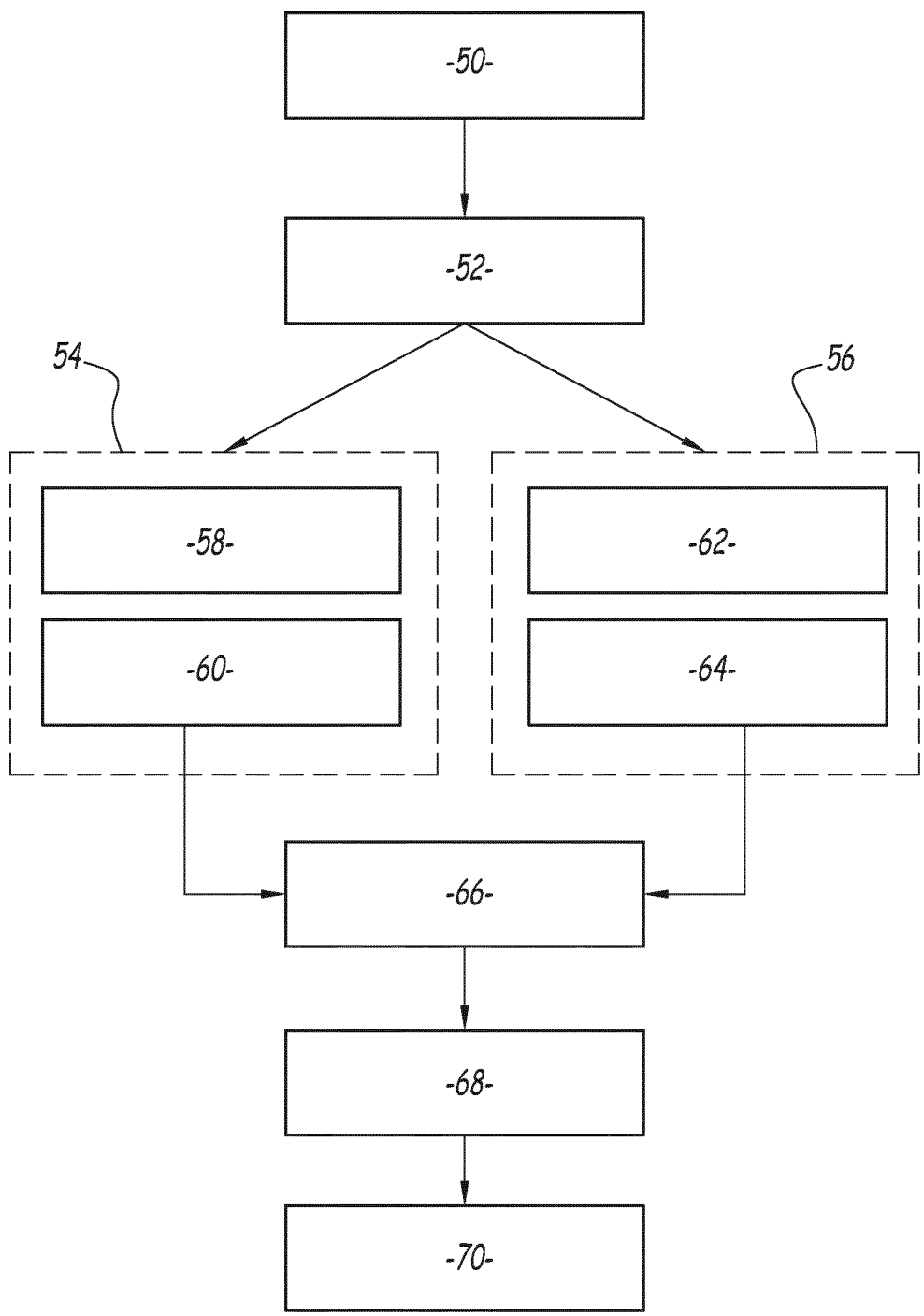
FIG. 2 is a block diagram of the main steps of a method for determining altitude obstacles in an embodiment of the invention.

FIG. 2 is a block diagram of the main steps of a method for determining altitude obstacles in an embodiment of the invention.

The method includes a step 50 for obtaining aerial images, in the form of digital images, of a source for acquiring digital aerial images, e.g. the image acquisition unit 10, representative of portions of terrain belonging to a given geographical area. The digital images obtained form a set of images covering the geographical area.

The geographical area is of any size.

The acquired digital images are for example in the visible range. As a variant, the digital images are in the infrared range or are radar or lidar digital images.

The digital images received are, in a known manner, represented by matrix of pixels, each pixel having an associated digital value, in an interval of values. The dimensions of the matrix indicate the resolution of the image.

In addition to the acquisition of digital images, information about the acquisition of the images, e.g. recorded in metadata of the file format encapsulating the digital images, is also received.

Such information on acquisition is preferentially stored, in connection with each digital image. The information on acquisition includes for example at least one geolocation information associated with the image, which can be used for accurately geolocating the portion of terrain represented, spatial resolution information being used for indicating the actual size of the terrain surface represented by each pixel, along with information on the date of acquiring said images. In one embodiment, the acquisition information further includes, information on the camera angle for each digital image.

The method further includes a step 52 of standardizing the digital images of the set of images, consisting of setting same at the same resolution and in the same image format. The image format is for example a known digital image encoding format such as JPEG, MPEG, GIF.

For each digital image, associated geolocation information is stored, which makes it possible to calculate spatial coordinates in a given reference frame, e.g. GPS coordinates, for each point of the digital image.

The method implements, in parallel or successively, a first image processing 54 and a second image processing 56.

In one embodiment, the first and second image processing are performed substantially in parallel.

The first image processing 54 makes it possible to obtain a first set of obstacles present in the geographical area and an associated height estimate.

The first image processing 54 includes a segmentation step 58 for obtaining a segmentation of objects likely to form altitude obstacles, each obstacle being classified in a previously identified category of obstacles.

Preferentially, the segmentation implemented is a semantic segmentation.

Semantic segmentation consists of determining, for each pixel, the category of object (obstacle or other) to which same belongs, the aim being to group them into regions in order to create a partition of the image. Moreover, it is useful to identify the pixels belonging to the obstacle and same belonging to projected shadow thereof so as to deduce the height thereof.

Preferentially, step 58 implements a semantic segmentation by a neural network, previously trained to recognize the categories of obstacles identified, by supervised learning.

Preferentially, semantic segmentation is performed by a U-net convolutional neural network, initially described in the article "U-Net: Convolutional Networks for Biomedical Image Segmentation by O. Ronnenberger et al, published in "Computer Vision and Pattern Recognition" in 2015. Optimized versions of the convolutional neural network architecture can of course also be used. Advantageously, the convolutional neural network architecture makes it possible both to optimize the quality of segmentation results and the computational complexity.

A plurality of categories of obstacles are used, for example including the following categories of obstacles: point-like obstacles, having as sub-categories, poles, wind turbines, water towers; linear obstacles.

Supervised learning takes place, in a known way, on digital images with segmented and identified obstacles in each of the categories.

In step 58, the obstacles and the associated category are detected automatically, and form a first set of obstacles.

Moreover, the first image processing 54 includes a step 60 for calculating a first height of each obstacle detected during step 58.

For a so-called point-like obstacle, the height is associated with a point of the obstacle, considered the highest point of the obstacle.

For a so-called linear obstacle, a plurality of segments are distinguished, each segment being defined by two end points, and the estimated height being associated with the highest end point (highest point) of all the segments forming the linear obstacle.

In one embodiment, such calculation is carried out from a digital image wherein the obstacle considered has been detected, using information relating to the acquisition of the digital image.

Figure 3:
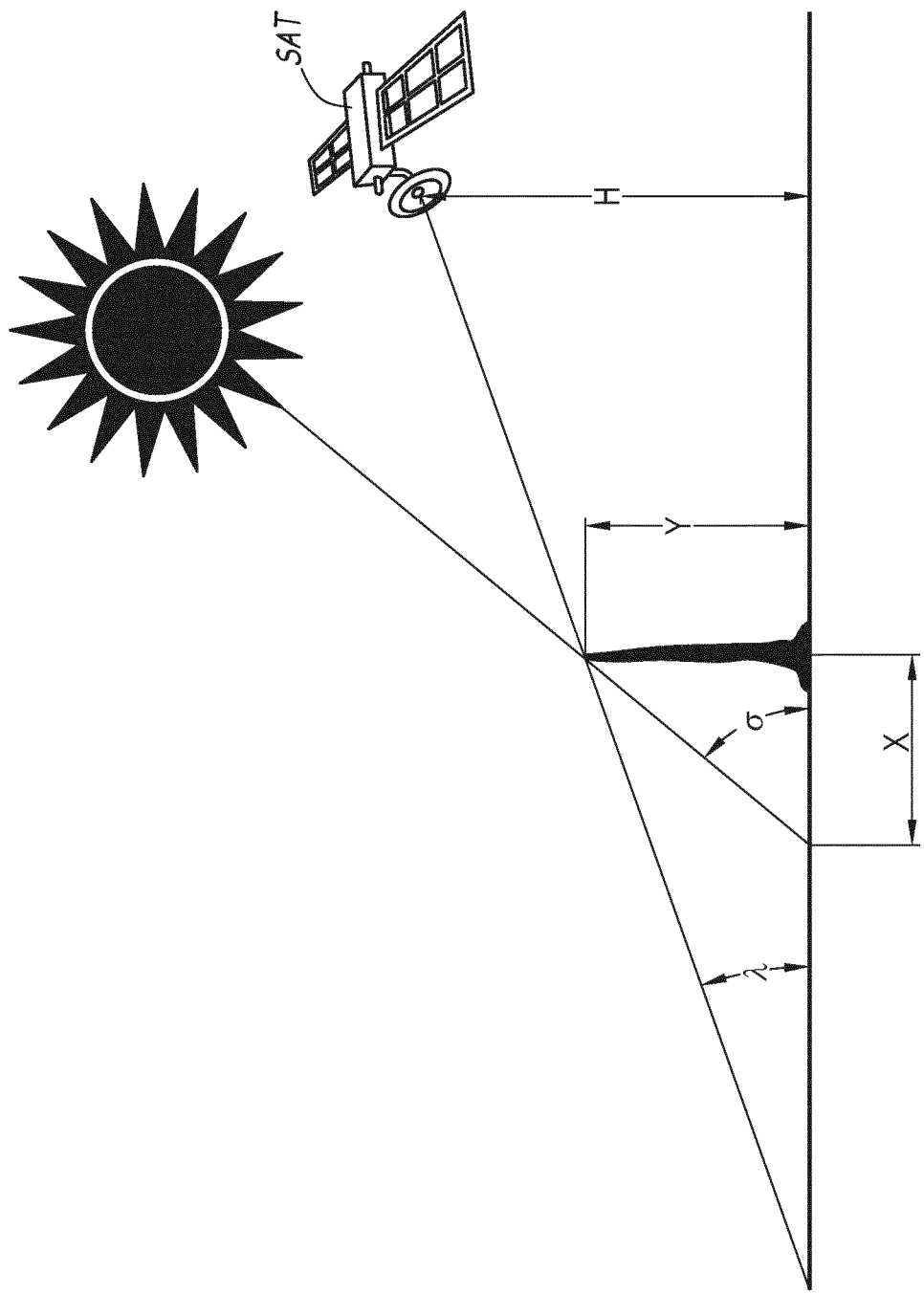
FIG. 3 schematically illustrates a determination of obstacle height according to one embodiment.

For example, as shown diagrammatically in FIG. 3, the calculation uses an estimated length X of the shadow of the obstacle, as well as the camera angle by the image acquisition device (a SAT satellite in the example) and/or the angle of illumination from the sun a. At least one of the two angles is sufficient for calculating a height with respect to the ground.

The estimated height from the ground Y is given by the formula:

$$Y = \tan(\alpha) \times X \quad \text{[Math 1]}$$

where the length X is the length of the shadow of the object projected on the ground, a the angle of incidence of the sun and Y is the height from the estimated ground.

The first height estimate is directly calculated by the formula [Maths 1]. The associated elevation is for example deduced from the estimation of the height with respect to the ground, knowing for example a digital terrain model with associated elevation information.

The first height estimate is stored, in relation to the spatial location of the detected obstacle and to the category to which the obstacle belongs.

Optionally, if the detected altitude obstacle is a point-like obstacle, a width is further calculated depending on the segmentation and resolution of a digital image wherein the obstacle was detected.

If the altitude obstacle is a linear obstacle, it is divided into a plurality of segments, and a first height estimate is associated with each segment. The first height estimate of the obstacle is for example equal to the maximum value of the height estimates at end points of each segment.

The second image processing 56 is used for obtaining a second set of obstacles present in said geographical zone and a second associated height estimate, greater than or equal to the predetermined minimum height.

The second image processing 56 includes a stereoscopic processing step 62 consisting of constructing, from a pair of digital images including two images of the same portion of terrain acquired with a known spatial camera offset, a three-dimensional reconstruction of said portion of terrain with a depth level which is also calculated. The three-dimensional reconstruction is for example represented by a three-dimensional matrix, wherein each point also has an associated height.

Any known stereoscopic processing algorithm can be used during step 62.

Step 62 is implemented for pluralities of pairs of digital images of the first set of digital images.

The stereoscopic processing step 62 is followed by a step 64 for detecting and locating point-like and linear objects with a height greater than or equal to a predetermined minimum height ($H_{threshold}$), e.g. equal to 30 meters.

At the end of step 64, points likely to belong to altitude obstacles are stored, as well as the associated height, which represent a second height estimate.

The above-mentioned steps are followed by a step 66 of merging the stored data, and a step 68 of consolidation, used for obtaining a consolidated set of altitude obstacles, with a height greater than or equal to $H_{threshold}$.

In one embodiment, the merging 66 consists in comparing, for the same obstacle of potential altitude detected, the first and second height estimates, and in verifying that the two estimates indicate a height greater than or equal to $H_{threshold}$.

In case of positive verification, the detection of the altitude obstacle is validated, and the identified obstacle is stored in the consolidated set of altitude obstacles.

In case of negative verification, if only one of the first and second estimates indicates a height greater than $H_{threshold}$, then during the consolidation step 68, supplementary data from an independent data source are used.

The additional data include for example a digital terrain model and/or LIDAR data or radar data for estimating the elevation of an obstacle above the ground.

The consolidation step checks the consistency of the obstacles detected with the supplementary datum or data. For example, if the highest point of an obstacle is lower than the elevation of a corresponding point of the digital terrain model, the obstacle is removed. In another example, the category of the obstacle may not be consistent with the geographical location (e.g. a wind turbine in the city center), wherein case, the detected obstacle is removed.

A consolidated set of detected obstacles is obtained at the end of step 68.

The method includes a step 70 of storing a set of attributes for each obstacle of the consolidated set of obstacles with a height greater than or equal to $H_{threshold}$ present in said geographical zone.

The set of attributes comprises e.g. spatial location, height, and type of obstacle attributes, encoded according to a given coding format, so as to form an obstacle database.

For point-like obstacles, for example the following attributes are stored:
OBS_ID: unique identifier of the obstacle over P characters, e.g. P=10;
DEC_LON: longitude of the position of the obstacle in decimal degrees;
DEC_LAT: latitude of the position of the obstacle in decimal degrees;
ELEV_M: elevation of the highest point of the obstacle in meters
HEIGHT_M: height of the highest point of the obstacle (with respect to the ground) in meters
WIDTH_M: width in meters [optional]
OBS_TYPE: type of obstacle
For linear obstacles, for example the following attributes are stored:
LINE_ID: unique identifier over P characters (same identifier for all segments of the linear obstacle), e.g. P=10;
SEG_ID: identifier of the segment of the linear obstacle over Q characters, e.g. Q=4;
SEG_TYPE: segment type for linear obstacle;
P1_ID: Identifier of the first point-like obstacle associated with the segment;
P2_ID: Identifier of the second point-like obstacle associated with the segment.

For each point-like obstacle, the point-like obstacle attributes mentioned above are entered.

A database of altitude obstacles in the chosen geographical area is thus formed and stored.

The altitude obstacle database thus formed, including obstacle location and identification attributes, is subsequently used in aircraft navigation at low or very low altitudes.

Figure 4:
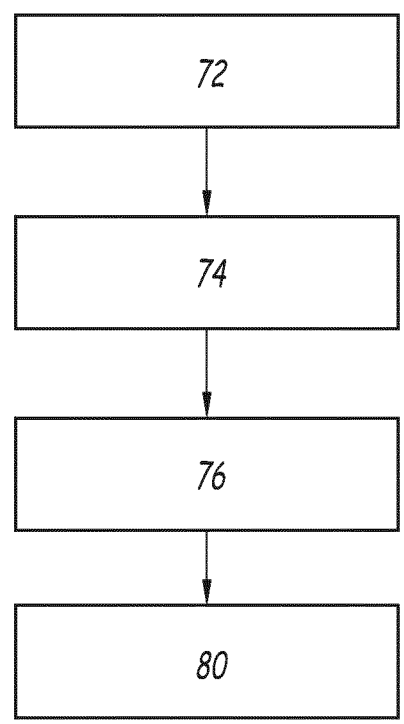
FIG. 4 is a block diagram of the main steps of an aircraft navigation method according to an embodiment of the invention.

FIG. 4 is a block diagram of the main steps of an aircraft navigation method in an embodiment of the invention.

The method includes a step 72 of requesting the determination of altitude obstacles specifying a given geographical area, and a step 74 of receiving obstacle attributes, e.g. in the form of a database, calculated by a method of determining altitude obstacles as described above.

The method then includes a step 76 of using such database for navigation. The step 76 for example consists of calculating an aircraft flight path avoiding the obstacles.

As a variant or in addition, during the step 78, the obstacles thus identified are further used by a navigation device, e.g. an automatic piloting device, and, optionally, displayed on a graphical user interface to be used by an aircraft pilot.

The invention was described above for a first image processing implementing a segmentation by a neural network and a second image processing implementing a stereoscopic processing.

In one embodiment, a first set of aerial images obtained from a first aerial image source is used for the first image processing, and a second set of aerial images obtained from a second aerial image source, independent of the first aerial image source, is used for the second image processing.

The invention claimed is:

1. An aircraft navigation method for determining altitude obstacles with a height greater than or equal to a predetermined minimum height, said altitude obstacles being likely to hinder aircraft navigation at low or very low altitude, said method being implemented by a processor of a digital processing device, and said method comprising:
   a. obtaining, for a given geographical area, digital aerial images of portions of terrain of said geographical area from at least one digital aerial image source, forming a set of digital aerial images covering said geographical area,
   b. applying a first image processing to the digital images of said set of images so as to obtain a first set of obstacles present in said geographical area and a first associated height estimate,
   c. applying a second image processing to the digital images of said set of digital images in order to obtain a second set of obstacles present in said geographical zone and a second associated height estimate, greater than or equal to said predetermined minimum height, and depending in the first and second height estimates,
   d. determining a consolidated set of altitude obstacles, with a height greater than or equal to said predetermined minimum height present in said geographical area, and storing in an electronic memory of the digital processing device attributes of each of the altitude obstacles of the consolidated set of altitude obstacles;
   e. wherein determining a consolidated set of obstacles comprises, for an identified obstacle, comparing each of the first height estimate and the second height estimate associated to said identified obstacle to said predetermined minimum height, and if both the first height estimate and the second height estimate are above said predetermined minimum height, including said identified obstacle in the consolidated set of altitude obstacles, and if one of said first height estimate or the second height estimate is lower than said predetermined minimum height, using at least one independent data source to determine a highest elevation point of said identified obstacle.

2. The method according to claim 1, wherein said first image processing further provides an indication of whether each obstacle of said first set of obstacles belongs to a predetermined category amongst a plurality of categories of obstacles likely to form altitude obstacles.

3. The method according to claim 2, wherein said first image processing includes a segmentation by applying a neural network, previously trained to identify obstacles belonging to one of the categories of said plurality of categories of obstacles.

4. The method according to claim 2, wherein the plurality of categories of obstacles comprises at least two categories of obstacles including a first category of point-like obstacles and a second category of linear obstacles.

5. The method according to claim 1, wherein the first image processing includes, for each identified obstacle, a calculation used for obtaining a first estimate of the height of said obstacle.

6. The method according to claim 5, wherein said calculation is a function of a corresponding illumination angle from the sun and an estimate of the length of the shadow of said identified obstacle in said digital aerial image.

7. The method according to claim 5, wherein said calculation is a function of a camera angle of a device for acquiring a digital aerial image comprising said identified obstacle.

8. The method according to claim 1, wherein the second image processing is a stereoscopic processing, comprising a processing by pairs of digital images of said set of digital aerial images, a pair of digital images including two digital images of the same portion of terrain acquired with a known spatial camera offset, said stereoscopic processing consisting of obtaining a three-dimensional reconstruction of said portion of terrain.

9. The method according to claim 8, wherein the second processing further includes a detection and a location of point-like and linear objects with a height greater than or equal to said predetermined minimum height in said three-dimensional reconstruction of the portion of terrain.

10. The method according to claim 1, wherein determining a consolidated set of obstacles further comprises verifying the estimated height of said obstacles as a function of at least one independent data source.

11. The method according to claim 10, wherein said independent data source is a digital terrain model.

12. The method according to claim 1, further including storing a set of attributes for each obstacle in the consolidated set of obstacles with a height greater than or equal to said predetermined minimum height present in said geographical area, said set of attributes including location, height and obstacle attributes.

13. The method according to claim 12, wherein said set of attributes is stored in a format selected to form a database of altitude obstacles.

14. An aircraft navigation method suitable for flying at low altitude in order to follow a trajectory flying over a given geographical area, said method comprising obtaining a consolidated set of altitude obstacles present in said geographical area, said consolidated set of obstacles being determined by a method for automatically determining altitude obstacles according to claim 1, and for avoiding altitude obstacles from said set of obstacles.

15. A computer program including software instructions which, when implemented by a programmable electronic device, implement a method for automatically determining altitude obstacles according to claim 1.

16. The method according to claim 1, wherein the first image processing and the second image processing are applied substantially in parallel on said set of digital images.

17. The method according to claim 1, wherein the attributes stored include, for a point-like obstacle, an estimated height of the highest elevation point of said point-like obstacle, and for a linear obstacle, at least one segment defined by a first end point and a second end point, an estimated height associated with the linear obstacle being the height of the highest end point of the at least one segment forming said linear obstacle.

18. An aircraft navigational device for automatically determining altitude obstacles with a height greater than or equal to a predetermined minimum height, said obstacles being likely to hinder aircraft navigation at low or very low altitude, the device comprising at least one processor configured for implement modules suitable for:
   a. obtaining, for a given geographical area, digital aerial images of portions of terrain of said geographical area from at least one digital aerial image source, forming a set of digital aerial images covering said geographical area,
   b. applying a first image processing to the digital images of said set of digital images so as to obtain a first set of obstacles present in said geographical area and a first associated height estimate,
   c. applying a second image processing to the images of said set of digital images in order to obtain a second set of obstacles present in said geographical zone and a second associated height estimate, greater than or equal to said predetermined minimum height, and
   d. depending on the first and second height estimates, determining a consolidated set of altitude obstacles, with a height greater than or equal to said predetermined minimum height present in said geographical area, and storing in an electronic memory of the digital processing device attributes of each of the altitude obstacles of the consolidated set of altitude obstacles;
   e. wherein determining a consolidated set of obstacles comprises, for an identified obstacle, comparing each of the first height estimate and the second height estimate associated to said identified obstacle to said predetermined minimum height, and if both the first height estimate and the second height estimate are above said predetermined minimum height, including said identified obstacle in the consolidated set of altitude obstacles, and if one of said first height estimate or the second height estimate is lower than said predetermined minimum height, using at least one independent data source to determine a highest elevation point of said identified obstacle.

* * * * *